United States Patent [19]

Lindner

[11] Patent Number: 5,404,650
[45] Date of Patent: Apr. 11, 1995

[54] CENTERING DEVICE FOR A MECHANICAL TRACER

[75] Inventor: Matthias Lindner, Bad Nauheim, Germany

[73] Assignee: Leitz Messtechnik GmbH, Wetzlar, Germany

[21] Appl. No.: 151,749

[22] Filed: Nov. 15, 1993

[30] Foreign Application Priority Data

Nov. 17, 1992 [DE] Germany .............. 42 38 724.8

[51] Int. Cl.[6] .................. G01B 5/03; G01B 7/03
[52] U.S. Cl. ................................ 33/559; 33/556
[58] Field of Search ............. 33/556, 559, 561, 572

[56] References Cited

U.S. PATENT DOCUMENTS

| 2,876,553 | 3/1959 | Tomkow | 33/169 |
| 3,009,252 | 11/1961 | Py | 33/556 |
| 3,945,124 | 3/1976 | Jacoby et al. | 33/169 R |
| 4,679,332 | 7/1987 | Luethi | 33/559 |
| 5,005,297 | 4/1991 | Achnett et al. | 33/556 |
| 5,018,278 | 5/1991 | Achnett et al. | 33/559 |
| 5,103,572 | 4/1992 | Ricklefs | 33/558 |
| 5,212,872 | 5/1993 | Spivey et al. | 33/559 |
| 5,259,122 | 11/1993 | Ichiba et al. | 33/559 |

FOREIGN PATENT DOCUMENTS

| 0351713 | 1/1990 | European Pat. Off. . |
| 1004516 | 3/1956 | Germany . |
| 2356030 | 5/1975 | Germany . |
| 23654984 | 4/1977 | Germany . |
| 2948712 | 6/1981 | Germany . |
| 4027136 | 3/1992 | Germany . |
| 4204632 | 8/1993 | Germany . |
| 481367 | 11/1969 | Switzerland . |
| 1095028 | 5/1984 | U.S.S.R. . |

Primary Examiner—William A. Cuchlinski, Jr.
Assistant Examiner—G. Bradley Bennett
Attorney, Agent, or Firm—Foley & Lardner

[57] ABSTRACT

A centering device for a mechanical tracer, with a flexural bar and at least two centering systems. Each centering system includes a pair of pistons which act on the flexural bar in opposite directions. A stop for one piston of each pair is provided, such that the piston bearing against the stop exerts, at least near the state of rest, twice as high a return force as the second piston of the pair. At least two centering systems are provided in order to impart different force/path characteristics to the tracer.

20 Claims, 2 Drawing Sheets

CENTERING DEVICE FOR A MECHANICAL TRACER

BACKGROUND OF THE INVENTION

The invention relates to a centering device for a mechanical tracer, and more particularly, to a centering device for a mechanical tracer having a driver and at least two pairs of return means acting on the latter in opposite directions.

A centering device is disclosed in German Patent Specification 2,356,030, in which there is provided for the coordinate measurement of a workpiece a tracer which is arranged on a spring parallelogram. When it runs along the workpiece, the tracer can drift by means of the flexion of a flexural bar and as a result of the suspension on the spring parallelogram. In order to return the tracer to its exact initial position after each measurement, a centering device is provided. In this centering device, resilient means are additionally provided in the case of each spring parallelogram in order to vary the force/path characteristic. The aim of this design is to limit the force acting on the tracer to an approximately constant maximum force even when pronounced deflections occur. The driver, at its end, carries a ball, on which springs of equal force and low spring constant act on both sides via plane thrust pieces. An arrangement of three balls in the centering device acts respectively on the two thrust pieces independently as a thrust and as a second stop for the first pieces loaded by the springs.

In order to guarantee a perfect hysteresis-free centering in the basic position, all the contact points provided between the ball of the driver, the balls of the stops and the thrust pieces must be in exact bearing contact at the same time. This is possible only at a high production outlay in terms of the accuracy of the balls and of the plane thrust pieces. During use, this quality necessarily diminishes as a result of wear, for example, by impact effect or by the friction of the ball of the driver on the thrust pieces.

The centering device according to German Offenlegungsschrift 4,027,136 constitutes a further development. In this centering device, the return means acting in opposite directions are designed in such a way that a stop, which can be multi-part, is provided for one return means. The return means bearing against the stop in the state of rest exerts, at least near the state of rest, twice as high a return force as the second opposite return means. Because the return means bearing against the stop does not act on the driver when the driver is deflected counter to the return force of the opposite return means, only the single return force acts on the ball of the driver. If the driver is deflected in the other direction, although twice as high a return force acts on the ball of the driver, nevertheless this return force counteracts the single return force of the opposite return means. Thus, in actuality, only the difference of the two return forces takes effect. A return force of equal amount is thereby obtained in both directions. Either spring-loaded pistons or pistons loaded by means of a fluid are provided as return means.

This design makes it possible, at most, to vary the maximum force occurring during deflection by varying the system pressure, but not to alter the region of the characteristic which is linear about the zero point. If the tracer system is to be matched as closely as possible to different measuring tasks, different centering devices have to be used for these different measuring tasks, and for each special measuring task it is necessary to use a special centering device which has the optimum force/path characteristic for the particular measuring task.

Furthermore, these centering devices belonging to the state of the art are sensitive to the vibrations of the tracer which are excited, for example, when the measuring head is moved back and forth between different measuring positions. These vibrations are dependent on the accelerations of the tracer. The vibrations disturb the measurement considerably when the tracer runs along the workpiece, and therefore the tracer has to be run onto the workpiece without appreciable acceleration, this being undesirable in terms of process technique.

SUMMARY OF THE INVENTION

Accordingly, it is an object of the present invention to provide a centering device for a mechanical tracer, the rigidity of which can be matched to a desired measuring task in a simple way, such that a high or a low rigidity of the system for measurement or even a very rigid clamping of the tracer can be accomplished.

It is another object of the present invention to provide a centering device in which the linear portion of the force/path characteristic can be readily varied according to the particular measuring task undertaken.

In accomplishing these and other objects, there has been provided according to one aspect of the invention a centering device having a flexural bar connected to a mechanical tracer. At least two centering systems are provided for selectively imparting different force/path characteristics to the mechanical tracer. Each centering system comprises a pair of return means, disposed on opposite sides of the flexural bar, for exerting a return force on the flexural bar when displaced. One return means of each pair provides twice the return force of the oppositely disposed return means, subject to a stop which limits the motion of the more forceful return means.

According to another aspect of the invention, there has been provided a mechanical tracing device with centering capability, comprising a mechanical tracer attached to a flexural bar. Centering of the tracer is accomplished by means of a housing which defines at least two pairs of cylindrical cavities which open toward one another and are disposed on opposite sides of the flexural bar. Pistons, disposed within the cavities, bear against the flexural bar when it is deflected as a consequence of a measuring task, thereby exerting a return force toward center.

According to yet another aspect of the invention, there has been provided a method for imparting different force/path characteristics to a mechanical tracer by supplying a mechanical tracing device of the type previously described and selecting, for a first measuring task, one of at least three force/path characteristics for the mechanical tracer. A first force/path characteristic may be selected by pressurizing only a first pair of cylinders, a second force/path characteristic by pressurizing only a second pair of cylinders, or a third force/path characteristic by simultaneously pressurizing both pairs of cylinders. A second measuring task is undertaken by selecting a different one of the three or more force/path characteristics.

Other objects, features and advantages of the present invention will become apparent to those skilled in the art when the preferred embodiments of the invention are more fully described below with reference to the drawings.

BRIEF DESCRIPTION OF THE DRAWINGS

Further details of the invention will be described with reference to the drawings, in which.

DETAILED DESCRIPTION OF THE PREFERRED EMBODIMENTS

Figure 1:
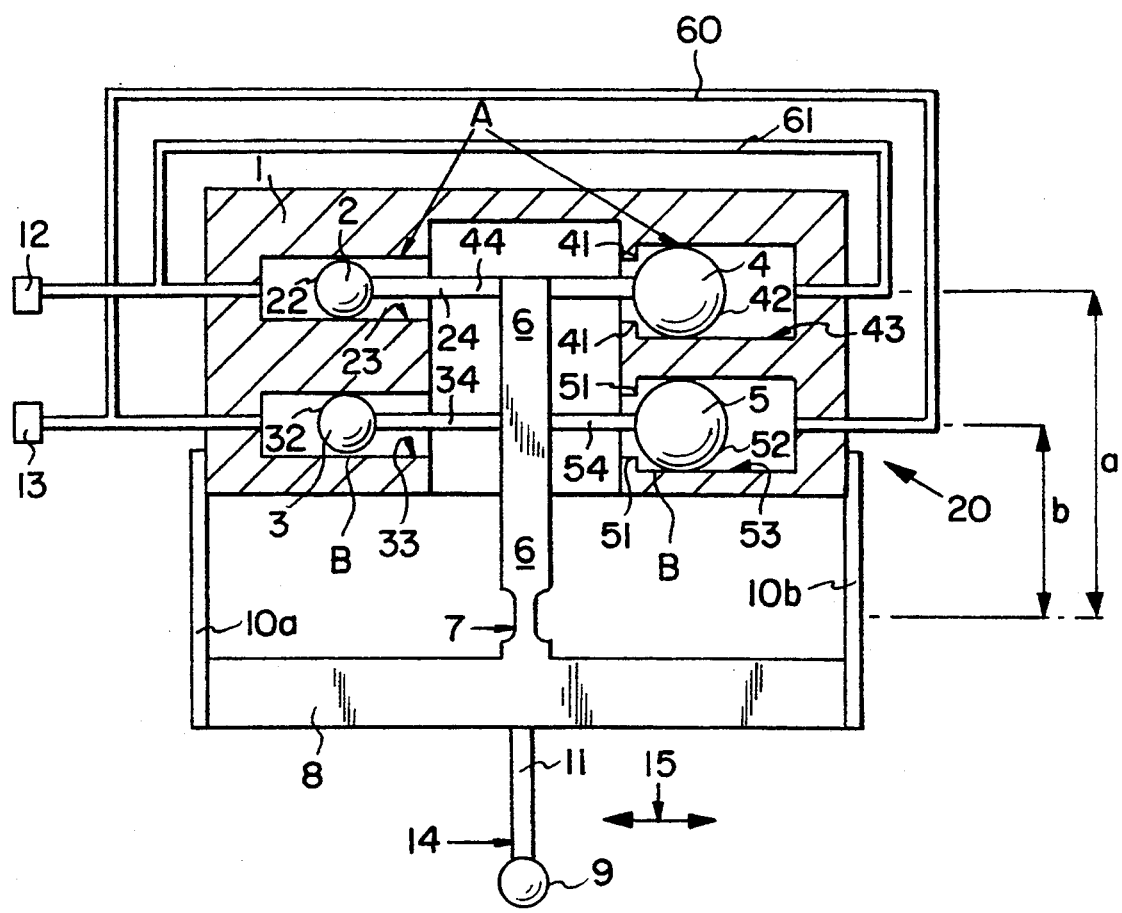
FIG. 1 shows, in section, a mechanical tracer with a centering device according to the present invention.

FIG. 1 shows a mechanical tracer with a centering device (20) according to the present invention. The housing (1) of the centering device (20) has cylinders (23, 43; 33, 53) in which spherical pistons (2, 4; 3, 5) are disposed. The spherical pistons (2, 4; 3, 5) can be pressure-loaded pneumatically. Provided for the pressure loading of the cylinders (23, 43; 33, 53) are lines (60, 61), into which, for example, compressed air is guided from a pressure reservoir (71, for example) via pneumatic connections (12, 13). The pressure-loaded faces (42, 52) of the spherical pistons (4, 5) are twice as large as the pressure-loaded faces (22, 32) of the spherical pistons (2, 3). In a preferred embodiment, stops (41, 51) are provided for the spherical pistons (4, 5).

The spherical pistons (2, 4) form the centering system (A). The spherical pistons (3, 5) form a second centering system (B).

According to one embodiment of the invention, the centering systems (A, B) act on bars (24, 44; 34, 54) which are connected to a flexural bar (6). The flexural bar (6) is firmly connected to a plate (8), which carries a receptacle for a tracer (14). The tracer (14) has a shank (11) and a tracing ball (9). The plate (8) is also connected to the housing (1) of the centering device (20) via spring sheets (10a, 10b). The flexural bar (6) is shown provided with a flexible zone (7).

The flexible zone (7) of the flexural bar (6) defines the gradient of the characteristics, i.e., slope of the force/path diagram, in the region about the zero point. From the kink in the diagram of FIG. 2, the characteristics are determined by the pressure acting on the spherical pistons (2, 4; 3, 5).

In the first place, the tracing force increases linearly with the deflection and is determined by the design of the flexible zone (7) and by the length of the flexural bar (6).

When a force corresponding to the system pressure and to the pressure-loaded face (22, 32; 42, 52) is reached, one of the spherical pistons is deflected and the tracing force then remains constant while the deflection increases further.

In a measuring operation, the ball (9) of the tracer (14) is deflected in the direction of the arrow (15). The spherical pistons (2, 4; 3, 5) act under pressure loading to counteract this deflection.

For a current measuring task, the system rigidity necessary for the measuring task can be adjusted by means of the centering systems (A and B). Since the centering systems (A, B) can be pressure-loaded separately, it is possible during measurement to select either the higher rigidity (that is to say pressure loading of the centering system (B)), or the lower rigidity (that is to say pressure loading of the centering system (A)). Matching the rigidity to the particular measuring task takes place in the simplest way by changing over the system pressure between the pneumatic connections (12, 13). The other respective connection is ventilated and thereby deactivated.

Figure 2:
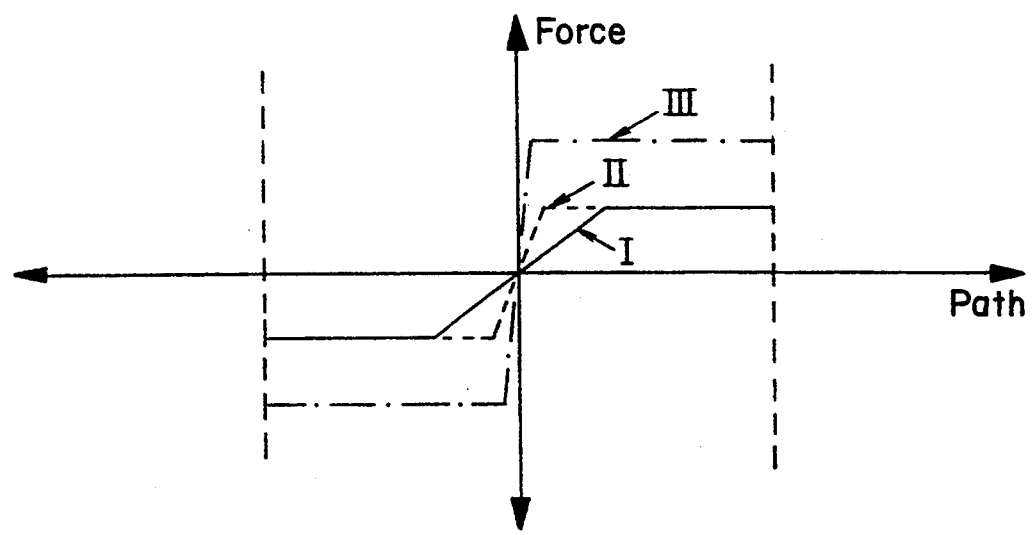
FIG. 2 shows a diagram of the force/path characteristics.

When the centering system (B) is activated, the centering device (20) has a high rigidity, as characterized in FIG. 2 by the force/path characteristic (II). When the centering system (B) is deactivated and the centering system (A) is activated, the centering device (20) then has the force/path characteristic (I).

When the pneumatic connections (12 and 13) are pressure-loaded simultaneously, the combination of the centering systems (A, B) takes effect. The resulting spring rigidity and the shifting force are thereby increased, so that, for example, during the positioning of the tracer (14), the centering systems (A and B) act together in a clamping manner.

The force/path characteristic for this instance is represented in FIG. 2 by the curve (III).

Figure 3:
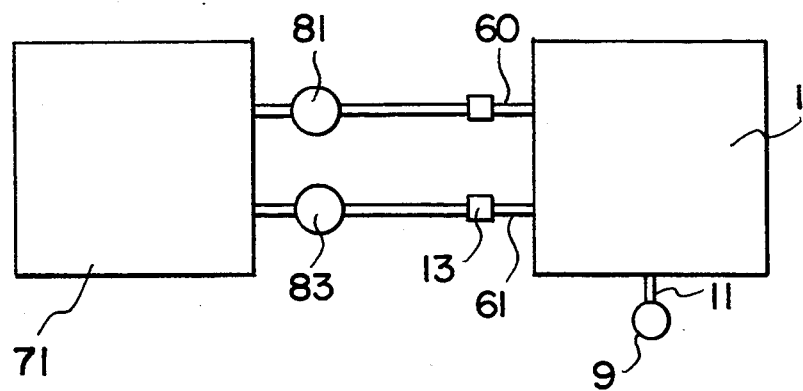
FIG. 3 is a schematic diagram showing a common fluid reservoir according to one embodiment of the present invention.
Figure 4:
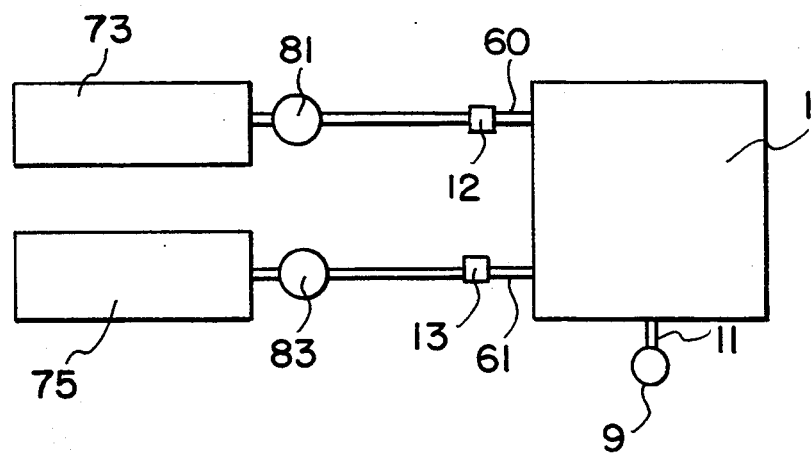
FIG. 4 is a schematic diagram showing separate fluid reservoirs according to another embodiment of the present invention.

Pressure loading of the centering systems (A, B) can be accomplished using either a single common fluid reservoir (71) as shown in FIG. 3, or separate fluid reservoirs (73, 75) as shown in FIG. 4. In either case, a fluid such as compressed air is supplied to the centering systems (A, B) through lines (60, 61) which emanate from the housing (1). Pressure lines leading from either the single common fluid pressure reservoir (71) of FIG. 3, or the separate fluid reservoirs (73, 75) of FIG. 4, are coupled to lines (60, 61) by means of pneumatic connections (12, 13). Conventional pressure adjusting devices (81, 83) may be disposed between the pneumatic connections (12, 13) and the fluid reservoirs (71;73, 75), or between the pneumatic connections (12, 13) and the housing (1).

Because the centering device has at least two centering systems, selected force/path characteristics can be imparted to the tracer. This is accomplished in such a way that the individual centering systems act either jointly or individually on the flexural bar, for example, by means of pistons via bars.

The two centering systems A and B act on the flexural bar, but with different effective lengths which then impart different force/path characteristics to the tracer.

Thus, during measurement, either a higher or a lower rigidity of the system can be selected according to the particular measuring task undertaken. The changeover takes place in the simplest way by changing over the system pressure between the two centering systems A and B.

The centering device according to the invention can therefore be used for different measuring tasks simply by being changed over. For example, the rigidity necessary for a measurement in which the tracer is in continuous contact with the workpiece will differ from that in which the tracer is moved up to various measuring points on the workpiece for individual measurements.

Moreover, the centering systems A and B can be activated simultaneously, that is to say a simultaneous pressure loading of the two centering systems can take place. The simultaneous pressure loading of the two centering systems A and B considerably increases the resulting rigidity of the system. The natural frequency of the spring/mass system formed from the moved tracer mass and the flexural bar increases correspondingly. This is of great advantage during the positioning of the tracer, since the amplitudes of the tracer excited in this phase are reduced appreciably. Accelerations undergone by the tracer, without shifting, during the positioning are also increased thereby, for example, approximately doubled in the case of simultaneous pressure loading. The simultaneous pressure loading of the two centering systems A and B thus achieves a clamping of the tracer which allows a rapid to-and-fro movement of the measuring head between the individual measuring positions.

If, as just stated, two centering systems are provided, then, in the tracer according to the invention, a choice can be made between three force/path characteristics, namely I, II and III, in order to achieve the closest possible matching to the respective measuring task. With curve I the system A is pressure-loaded, with curve II the system B is pressure-loaded and with curve III both systems are pressure-loaded.

According to the invention, at least two centering systems are provided, so that, with an increasing number of centering systems, a choice can be made between a plurality of force/path characteristics.

While the invention has been described with reference to particular embodiments thereof, those skilled in the art will appreciate that certain modifications and additions can be made without departing from the field of the invention which should only be limited in scope by the appended claims.

What is claimed is:

1. A centering device for a mechanical tracer, comprising:
   a flexural bar connected at one end to the mechanical tracer;
   at least two centering systems for selectively imparting different force/path characteristics to the mechanical tracer, each of said centering systems having first and second return means, disposed on opposite sides of said flexural bar, for exerting a return force upon said flexural bar; and
   a stop positioned between said flexural bar and said first return means;
   wherein said first return means, as it approaches said stop, exerts twice the return force of said oppositely disposed second return means.

2. A centering device according to claim 1, wherein each of said return means includes a fluid-filled cylinder and a piston disposed within said fluid-filled cylinder.

3. A centering device according to claim 2, wherein each piston has a pressure-loaded face and a surface area associated with said pressure-loaded face, the ratio of surface areas which correspond to mutually opposite pistons being about 1:2, said centering device further comprising a common fluid reservoir for each pair of mutually opposite cylinders.

4. A centering device according to claim 3, further comprising means for adjusting fluid pressure in said common fluid reservoirs.

5. A centering device according to claim 2, further comprising at least two fluid reservoirs, wherein each of said at least two centering systems is connected to a separate fluid reservoir.

6. A centering device according to claim 2, further comprising a common fluid reservoir, wherein said at least two centering systems are both connected to said common fluid reservoir.

7. A centering device according to claim 2, wherein the fluid contained in said fluid-filled cylinder is compressed air.

8. A centering device according to claim 1, wherein each of said return means includes a fluid-filled cylinder and a spherical piston disposed within said fluid-filled cylinder.

9. A centering device according to claim 8, further comprising a plurality of bars which are fastened to said flexural bar such that each of said spherical pistons acts upon said flexural bar through one of said plurality of bars.

10. A centering device according to claim 1, wherein said flexural bar is provided with a flexible zone consisting of a reduction in cross-sectional area of said flexural bar.

11. A centering device according to claim 10, wherein said at least two centering systems are positioned at different effective distances from said flexible zone.

12. A centering device according to claim 10, wherein said flexible zone is disposed between said mechanical tracer and said at least two centering systems.

13. A mechanical tracing device with centering capability, comprising:
    a mechanical tracer having a tracer shank and a tracer ball attached to one end of said tracer shank;
    a flexural bar attached to another end of said tracer shank;
    a housing defining at least two pairs of cylindrical cavities, each pair opening toward one another and disposed on opposite sides of said flexural bar, a first cylindrical cavity of each pair having a cross-sectional area twice that of a second cylindrical cavity making up the pair, each of said first cylindrical cavities being provided with a stop disposed at an end of said first cylindrical cavity closest to said flexural bar; and
    a plurality of pistons of one of two sizes, each of which is disposed within a single cylindrical cavity of corresponding size.

14. A mechanical tracing device according to claim 13, wherein said mechanical tracer further includes a plate which is disposed between said tracer shank and said flexural bar, and a pair of spring sheets which attach said plate to said housing, said plate extending perpendicularly from said tracer shank to said pair of spring sheets.

15. A mechanical tracing device according to claim 14, wherein said flexural bar is provided with a zone of increased flexibility between said plate and said housing.

16. A mechanical tracing device according to claim 15, wherein said pistons are spherical.

17. A mechanical tracing device according to claim 13, further comprising at least two fluid reservoirs, each of which holds fluid for a single pair of oppositely disposed cylindrical cavities.

18. A mechanical tracing device according to claim 13, further comprising a single common fluid reservoir and lines disposed between said cylindrical cavities and said single common fluid reservoir for supplying fluid to said cylindrical cavities.

19. A mechanical tracing device according to claim 13, further comprising a pressurized fluid disposed within said cylindrical cavities.

20. A method for imparting different force/path characteristics to a mechanical tracer, comprising the steps of:

a) providing a mechanical tracing device including a mechanical tracer having a tracer shank and a tracer ball attached to one end of said tracer shank; a flexural bar attached to another end of said tracer shank; a housing defining at least two pairs of cylindrical cavities, each pair opening toward one another and disposed on opposite sides of said flexural bar, a first cylindrical cavity of each pair having a cross-sectional area twice that of second cylindrical cavity making up the pair, each of said first cylindrical cavities being provided with a stop disposed at an end of said first cylindrical cavity closest to said flexural bar; and a plurality of pistons of one of two sizes, each of which is disposed within a single cylindrical cavity of corresponding size;

b) selecting, for a first measuring task, one of at least three force/path characteristics for said mechanical tracer, a first force/path characteristic being selected by pressurizing only a first pair of said cylinders, a second force/path characteristic being selected by pressurizing only a second pair of said cylinders, and a third force/path characteristic being selected by simultaneously pressurizing both of said first and second pairs of said cylinders; and c) selecting, for a second measuring task, a different one of said at least three force/path characteristics.

* * * * *